March 15, 1960 A. V. STAVRAKIS ET AL 2,928,620

REELING SYSTEM

Filed Oct. 18, 1954 2 Sheets-Sheet 1

INVENTORS
Alexander V. Stavrakis
& Charles J. Kennedy
BY Morris A. Rabkin
ATTORNEY.

March 15, 1960 A. V. STAVRAKIS ET AL 2,928,620

REELING SYSTEM

Filed Oct. 18, 1954 2 Sheets-Sheet 2

INVENTORS
*Alexander V. Stavrakis*
*& Charles J. Kennedy*
BY *Morris B. Rabkin*
ATTORNEY United States Patent Office 2,928,620
Patented Mar. 15, 1960

2,928,620

REELING SYSTEM

Alexander V. Stavrakis, Upper Darby, Pa., and Charles J. Kennedy, Westmont, N.J., assignors to Radio Corporation of America, a corporation of Delaware Application October 18, 1954, Serial No. 462,729

The terminal fifteen years of the term of the patent to be granted has been disclaimed 1 Claim. (Cl. 242—68.3)

This invention relates to reeling systems, and particularly to reel support and driving mechanisms.

In tape and film reeling systems, mechanisms are often desired which provide quick and easy mounting and changing of reels. Such mechanisms preferably provide a firm and positive lock between a reel and the reel drive. Further, the locked position should be readily distinguishable from the condition in which the reel is released. An operator should not be able to lock a reel which is improperly placed and supported. It is also desirable to be able to change reels without handling separate knobs or holding devices. Economy, simplicity, and reliability are desirable.

Accordingly, an object of the present invention is to provide an improved reel support and driving mechanism which provides easier and more rapid reel changing than the mechanisms of the prior art.

Another object of this invention is to provide an improved reel support and driving mechanism, on which a reel may be easily and simply mounted, and at the same time positively held.

Another object of this invention is to provide an improved reel support and driving mechanism which is simpler to operate and more economical in construction than the mechanisms of the prior art.

A further object of this invention is to provide an improved reel support and driving mechanism having clearly defined operating positions and which will not hold a reel which is improperly mounted.

In accordance with the invention, a reel support and drive is provided which firmly holds or loosely supports a reel, depending only upon two operating positions of a control knob. A reel is passed over a control knob mounted on the end of a drive shaft and slipped on a reel support which is fixed to the drive shaft. The reel support functions as a hub with respect to the drive shaft. When on the hub the reel contacts a resilient ring fixed to the hub. The hub is also provided with peripheral slots axially spaced from the resilient ring approximately the width of a reel. When the control knob is in one position, away from the hub, a reel may be removed from, or placed on, the hub. When the control knob is pressed inward toward the reel hub, however, retaining pins move outward through the slots, forcing the reel against the resilient ring. With the control knob in the second operating position, relatively close to the hub, the reel is held firmly. The retaining pins are coupled to the control knob through pivoted toggle links. A maximum mechanical advantage is provided at the position at which the retaining pins first encounter the reel and force the reel against the resilient ring. The arrangement of the toggle links and retaining pins, together with a spring biasing arrangement, provide a positive two position action of the control knob.

The novel features of the invention, as well as the invention itself, both as to its organization and method of operation, will best be understood from the following description, when read in connection with the accompanying drawings, in which like reference numerals refer to like parts, and in which.

Figure 1:
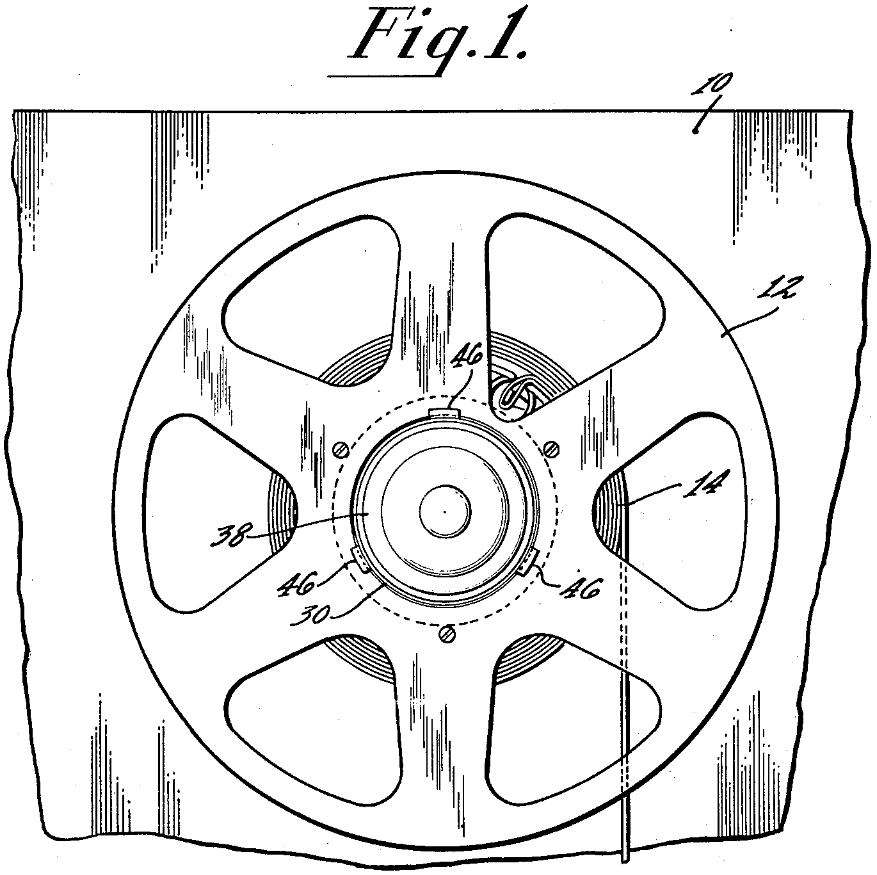
Fig. 1 is a front view of a portion of a reeling system embodying the present invention.

With reference to Fig. 1, a reeling system may be mounted on a mounting panel 10. The system may utilize a tape reel 12, on which may be wound an elongated medium such as a magnetic tape 14.

The mechanism (refer to Figs. 2, 3, and 4) for holding and driving the tape reel 12 is positioned about a drive shaft 16. Ball bearings 18 provide a rotatable mounting for the drive shaft 16. The bearings 18 are attached to a bearing support 20 secured to the mounting panel 10 through screws 22.

To turn the drive shaft 16, a drive pulley 24 may be mounted at one end of the drive shaft 16. Drive may be accomplished through a drive belt 26 in operative relation with the drive pulley 24 and under power from a drive motor (not shown) or other motive force.

A reel support hub 30 is mounted on the free end of the drive shaft 16. The reel support hub 30, on its supported mounting panel 10 side, has a wall or flange 32 of greater diameter than the remainder of the hub 30. The reel support hub 30 is fixed to and rotates with the drive shaft 16. A resilient ring 34 attached to the flange 32 on the side away from the mounting panel 10 acts as a reel facing for the flange 32. The resilient ring 34 may be of rubber, or rubber-like material, in order to have the properties of (1) being compressible and (2) providing a non-slip holding surface for a reel.

The reel 12 may be slipped over the hub 30 to the facing provided by the resilient ring 34. The hub 30 also includes a number of radial slots extending through the periphery of the hub 30 on its unsupported reel mounting end. In the present example, three slots are employed, disposed with radial symmetry about the hub 30. The axial distance between the resilient ring 34 and the circumference of the hub 30 passing through the slot edges closest to the resilient ring 34 is slightly less than the width of the tape reel 12. The surface of the hub which is bounded by the resilient ring 34 on one side and the slots on the other may be said to comprise a reel support surface.

The drive shaft 16 extends through the reel hub 30, and terminates at its free end in a removable flange member 36. A control knob 38 having a sleeve portion 40 pinned to the body portion is slidably mounted along the axis of the drive shaft 16. The control knob 38 may be moved manually along the drive shaft 16 between the reel hub 30 and the drive shaft flange 36.

Linkages are coupled to and extend radially from the sleeve portion 40 of the control knob 38. Each linkage is directed through a different one of the radial slots in the hub 30. Each linkage includes a toggle link 42 which may pivot about a fixed pivot pin 44 mounted in the control knob sleeve 40. Each linkage also includes a retaining pin 46 pivotally coupled through a central pivot pin 48 to the free end of the associated toggle link 42. Each retaining pin 46 is in registry with and moves through a different one of the radial slots on the hub 30. The radial slots therefore define guide surfaces for the retaining pins 46. The edge of each retaining pin 46 which is adjacent the reel support surface in the hub 30 is chamfered.

Separate coil springs 50 couple various pairs of the central pivot pins 48. The springs 50 bias the linkages toward the axis of the drive shaft 16.

Figures 2, 3, 4:
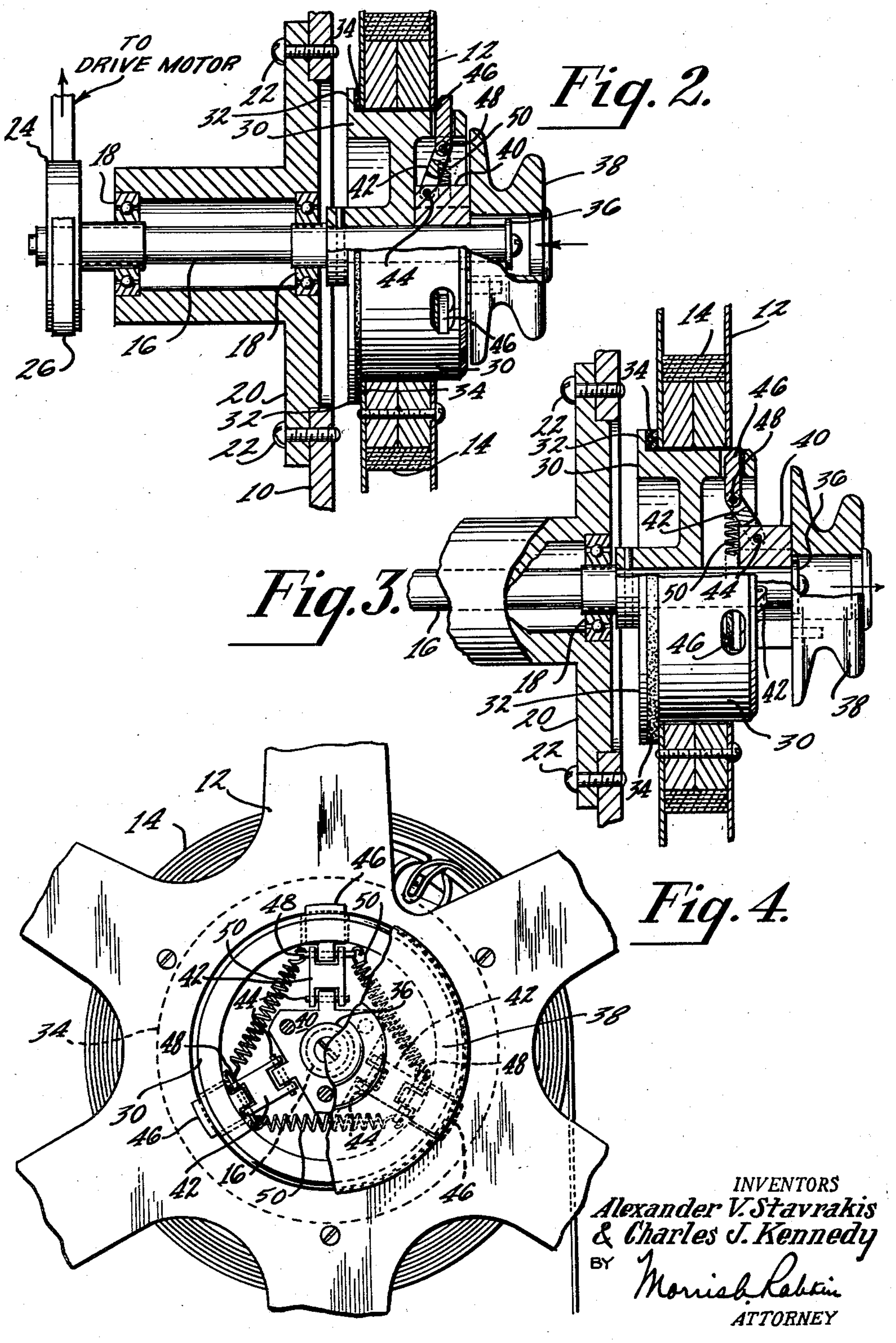
Fig. 2 is a side elevation of the reeling system of Fig. 1, partly in section and showing the mechanism in the reel holding position.
Fig. 3 is a side elevation of the reeling system of Fig. 1, partly in section and showing the mechanism in the position in which the reel is released.
Fig. 4 is a front view, somewhat enlarged and partially broken away, of a portion of the mechanism of Fig. 1.

In operation (referring to Figs. 2, 3, and 4), the position of the control knob 38 determines whether a reel 12 on the hub 30 is firmly held or freely supported. When the control knob 38 is out, away from the hub 30, the ends of the retaining pins 46 are within the periphery of the reel support hub 30. A reel 12 may, therefore, be slipped on the hub 30 to contact the facing provided by the ring 34. The resilient ring 34 is not under compression. As seen in Fig. 3, however, when the ring 34 is thus contacted but not compressed, the width of the reel 12 is such that the edge of the reel 12 is slightly within the openings in the slotted portions of the hub 30. With the control knob 38 pulled out away from the reel hub 30, a reel 12 on the reel hub 30 is free to be removed if desired. With the control knob 38 in the out position each toggle link 42 is at an angle to the drive shaft 16 and slanted toward the control knob 38 end of the drive shaft 16.

However, when the control knob 38 is pressed in to meet the hub 30, the reel 12 is firmly gripped. As the knob 38 is moved in from the out position, each linkage comprised of a toggle link 42 and a retaining pin 46 first straightens out and forms a right angle to the drive shaft 16. When the retaining pins 46 first extend beyond the hub 30 periphery the chamfered edges of the retaining pins 46 engage the outer edge of the reel 12. As the retaining pins 46 move further out, the chamfered edges force the reel 12 against the resilient ring 34. The reel 12 is therefore placed under compression between the retaining pin 46 and the resilient ring 34. Each retaining pin 46 travels past the inner surface of the reel 12, so that the flat surface on the retaining pin 46 engages the edge of the reel 12. As the control knob 38 is moved in close to the hub 30 the toggle links 42 are again at an angle less than the perpendicular to the drive shaft 16. In this position, however, the toggle links 42 slant toward the hub 30. Thus the retaining pins 46 are drawn back slightly from a maximum extension toward the drive shaft 16 as the knob 38 moves into contact with hub 30. The withdrawal, however, is not sufficient to pull the chamfered edges of the pins 46 back to the edge of the reel 12. With the control knob 38 in the in position, toward the hub 30, therefore, the reel 12 is securely gripped between the resilient ring 34 and the flat surfaces of the retaining pins 46 and moves with the hub 30.

Note that the chamfered edges of the pins 46 act as wedges in pressing the reel 12 against the ring 34. If a reel 12 is improperly positioned for mounting on the hub 30, the tips of the retaining pins 46 contact the inner surface of the reel 12. Therefore, the control knob 38 is blocked from moving into the lock position and the operator knows that the reel should be adjusted. Note also that the mechanical advantage provided by the linkages is greatest as the linkages are straightened out. Therefore, the largest mechanical advantage is available when engaging the reel 12 and compressing the ring 34. The forces required to push in the control knob 38 are thus quite uniform throughout the motion of the knob 38, and small in proportion to the force provided for locking the reel 12 to the hub 30.

The action of the linkages, and the bias exerted by the coil springs 40, provide two position operation of the control knob 38. When the control knob 38 is away from the reel hub 30, the coil springs 50 tend to pull the retaining pins 46 toward the drive shaft 16. Thus the linkages act to hold the control knob at this outer position, with the sleeve portion 40 resting against the flange member 36 on the drive shaft 16. A force sufficient to overcome the biasing effects of the spring 50 and to lock the reel 12, however, forces the knob 38 toward the hub 30 until the sleeve portion 40 contacts the knob 38. In this latter position the springs 50 again tend to pull the retaining pins 46 toward the drive shaft 16, forcing the sleeve portion 40 of the control knob 38 against the reel support hub 30. The mechanical advantages provided by the linkages also assist in holding the knob 38 at either of the two extreme positions. The manual force required to move the knob 38 from one position to another, however, is not great.

Thus there has been described a positive locking and at the same time easily operable support and driving mechanism for a reeling system. Simple two position operation of a centrally located knob permits easy and positive fixing of a reel to its support, or easy interchange of reels. A reel cannot be improperly locked in position. The support member provided is characterized by simplicity of construction and operation. The mechanism may be employed in other applications in which an apertured member is fitted to a central holding element.

What is claimed is:

In a tape reeling system, a reel support and driving mechanism comprising a drive shaft have a support end and an unsupported reel mounting end, means to rotate said drive shaft, a reel support hub fixedly mounted on said drive shaft, said reel support hub having a flanged portion adjacent said drive shaft support end and a plurality of radial slots extending therethrough on a given circumference thereof adjacent said drive shaft reel mounting end, said flanged portion and slots being spaced apart approximately the width of a reel and defining the limits of a reel support surface on said hub, a resilient ring member fixed to said flanged portion and providing a backing for a reel mounted on said hub, a control knob mounted on said drive shaft reel mounting end and manually movable between limits on the axis of said drive shaft, said control knob fixed against rotation relative to said drive shaft, a plurality of toggle links pivotally coupled to said control knob, each of said toggle links being in the radial line of a different one of said slots in said reel hub, a plurality of retaining pins, each pivotally coupled to a different one of said toggle links, and each being in the radial line of and extending radially through a different one of said slots in said reel hub, said retaining pins having chamfered edges facing said reel support portion of said reel hub, said retaining pins pressing a reel on said reel support surface against said resilient member when said control knob is moved to the limiting position adjacent said reel hub, and spring means coupling said retaining pins and biasing said retaining pins toward said drive shaft.

References Cited in the file of this patent

UNITED STATES PATENTS

| | | |
|---|---|---|
| 1,099,509 | Nelson | June 9, 1914 |
| 1,946,455 | Davis | Feb. 6, 1934 |
| 2,116,735 | Stevens | May 10, 1938 |
| 2,249,043 | Root | July 15, 1941 |
| 2,615,643 | Barsam | Oct. 28, 1952 |
| 2,652,989 | Ripley | Sept. 22, 1953 |
| 2,663,509 | Hinchman | Dec. 22, 1953 |
| 2,667,253 | Sherman | Jan. 26, 1954 |
| 2,696,950 | Ranger | Dec. 14, 1954 |

FOREIGN PATENTS

| | | |
|---|---|---|
| 896,860 | France | May 8, 1944 |